US006891684B2

(12) United States Patent
Taki

(10) Patent No.: US 6,891,684 B2
(45) Date of Patent: May 10, 2005

(54) IMAGE TAKING LENS SYSTEM

(75) Inventor: Yoshiyuki Taki, Tochigi (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 10/627,474

(22) Filed: Jul. 25, 2003

(65) Prior Publication Data

US 2004/0017617 A1 Jan. 29, 2004

(30) Foreign Application Priority Data

Jul. 26, 2002 (JP) .......................................... 2002-217415

(51) Int. Cl.[7] .............................................. G02B 15/14
(52) U.S. Cl. ....................................... 359/773; 359/771
(58) Field of Search ................................ 359/644, 650, 359/660, 684, 686, 693, 715, 734, 747, 753, 776–7, 771–73, 754–6, 763

(56) References Cited

U.S. PATENT DOCUMENTS

| 4,986,643 | A | | 1/1991 | Moriyama | 359/693 |
| 5,007,720 | A | | 4/1991 | Hamanishi | 359/693 |
| 5,440,430 | A | * | 8/1995 | Sato | 359/683 |
| 6,246,833 | B1 | * | 6/2001 | Harada | 396/79 |
| 6,487,023 | B2 | * | 11/2002 | Yoneyama | 359/687 |

FOREIGN PATENT DOCUMENTS

| JP | 2019814 A | 1/1990 |
| JP | 2285313 A | 11/1990 |

* cited by examiner

*Primary Examiner*—Jordan M. Schwartz
*Assistant Examiner*—Jessica Stultz
(74) *Attorney, Agent, or Firm*—Morgan & Finnegan, LLP

(57) ABSTRACT

This specification discloses an image taking lens system which can quickly effect focusing from an infinity object to a short-distance object. The image taking lens system disclosed in the present specification has, in succession from an object side to an image side, a first lens unit, a second lens unit, a third lens unit and a fourth lens unit. In case of focusing from the infinity object to the short-distance object, the first lens unit is not moved, but the second lens unit is moved to the image side and the third lens unit is moved to the object side. The principal point interval between the first lens unit and the second lens unit is a negative value.

12 Claims, 16 Drawing Sheets

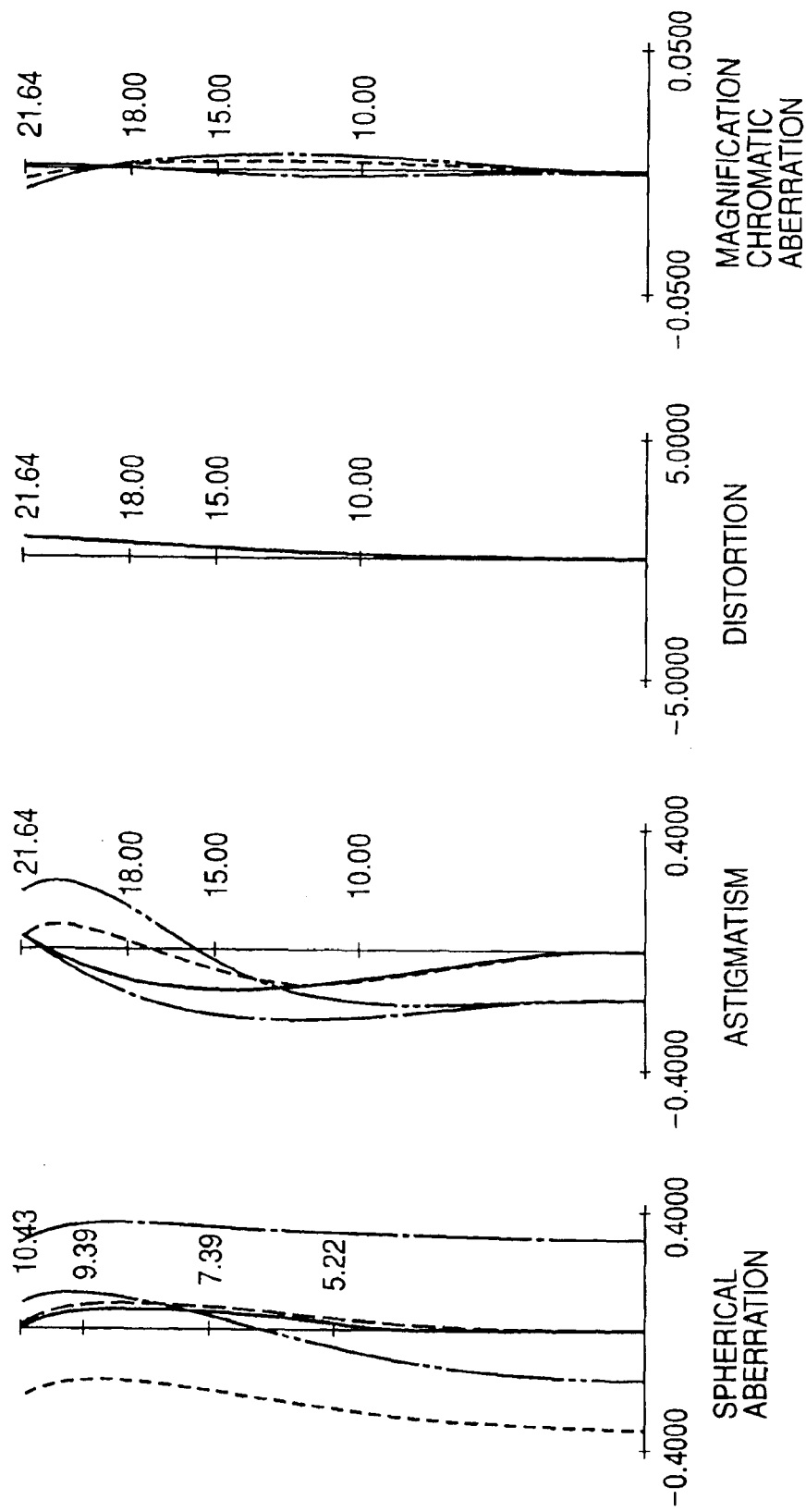

IMAGE TAKING LENS SYSTEM

BACKGROUND OF THE INVENTION

1. Field of the Invention

This invention relates to an image taking lens system, and particularly to a so-called macrolens capable of photographing an infinity object to a short-distance object of a one-to-one magnification degree in a silver halide photographic camera, a video camera, a digital still camera or the like.

2. Related Background Art

As an image taking lens chiefly directed to the photographing of a short-distance object, there has heretofore been what is called a macrolens or a microlens (hereinafter referred to as the "macrolens").

The macrolens, as compared with other image taking lenses such as an ordinary standard lens and a telephoto lens, is designed such that high optical performance is obtained particularly in case of the photographing of a short-distance object.

Also, in many cases, the macrolens is utilized for the photographing of objects at a wide range of distance including not only a short-distance object but also an infinity object.

Generally, in case of focusing from an infinity object to a short-distance object, as the photographing magnification becomes greater, the fluctuations of various aberrations become vehement and optical performance is aggravated. Therefore, a floating method has heretofore been adopted to correct the fluctuations of the various aberrations.

In Japanese Patent Application Laid-Open No. 2-19814 (corresponding U.S. Pat. No. 4,986,643) and Japanese Patent Application Laid-Open No. 2-285313 (corresponding U.S. Pat. No. 5,007,720), there is disclosed a lens system capable of short-distance photographing which is comprised of three lense units, i.e., a first lens unit of positive refractive power, a second lens unit of positive refractive power and a third lens unit of negative refractive power. In these examples of the prior art, there is proposed a focusing method whereby when effecting photographing at a low magnification to a high magnification in conformity with a change in an object distance, floating is effected with the first lens unit of positive refractive power and the second lens unit of positive refractive power moved to the object side while the interval between the first lens unit and the second lens unit is changed with the third lens unit of negative refractive power kept stationary relative to the image plane.

However, in the method whereby the first lens unit is moved in case of floating, the amount of movement of the lens unit generally becomes great. Therefore, to adopt this method in a camera having the auto focusing function, an actuator having great driving torque becomes necessary, or otherwise high-speed auto focusing becomes difficult.

SUMMARY OF THE INVENTION

The present invention has as its object to provide an image taking lens system of a novel construction which can quickly effect focusing from an infinity object to a short-distance object and moreover, can well correct any fluctuations of aberrations resulting from the focusing.

An image taking lens system according to an aspect of the present invention has, in succession from an object side to an image side, a first lens unit, a second lens unit, a third lens unit and a fourth lens unit, and is characterized in that in case of focusing from an infinity object to a short-distance object, the first lens unit is not moved, but the second lens unit is moved to the image side and the third lens unit is moved to the object side.

The principal point interval between the first lens unit and the second lens unit is a negative value.

BRIEF DESCRIPTION OF THE DRAWINGS

FIGS. 8A and 8B show the aberrations of the image taking lens according to the third numerical embodiment.

DETAILED DESCRIPTION OF THE PREFERRED EMBODIMENTS

Figures 1A, 1B:
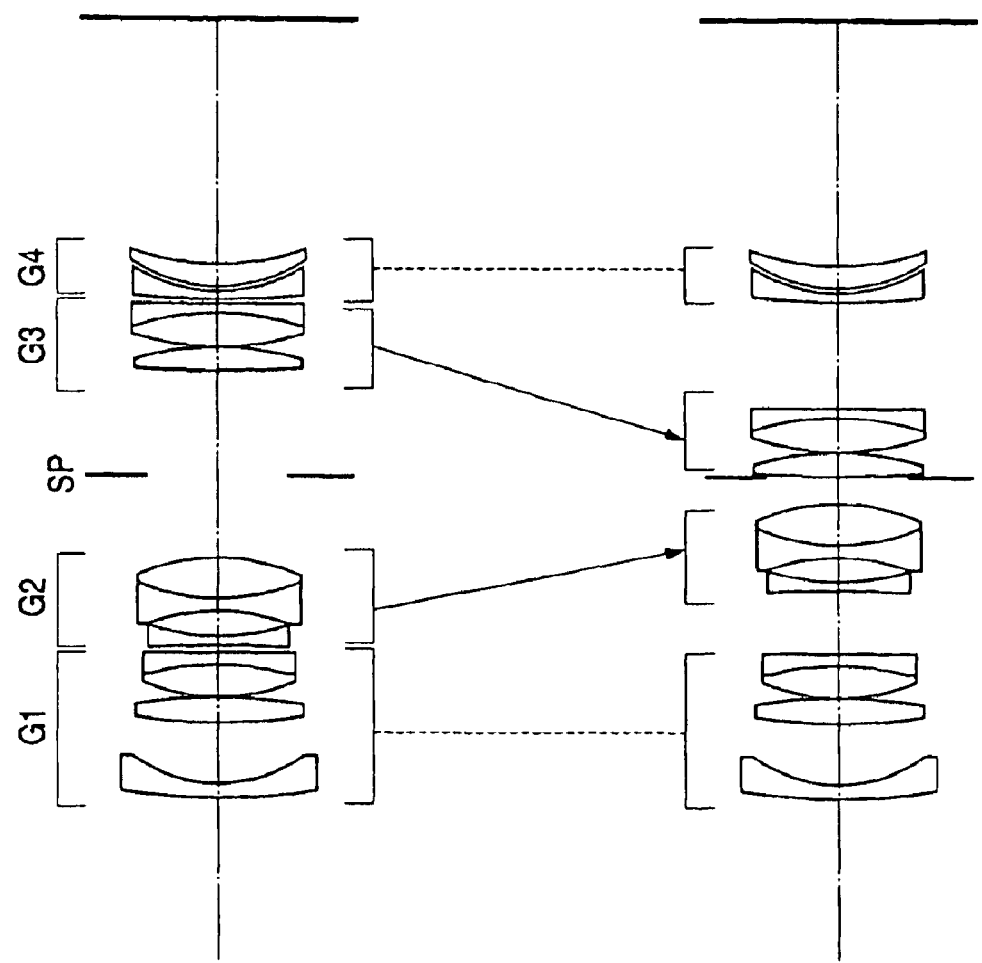
FIGS. 1A and 1B are lens cross-sectional views of an image taking lens according to a first numerical embodiment.
Figures 2A, 2B:
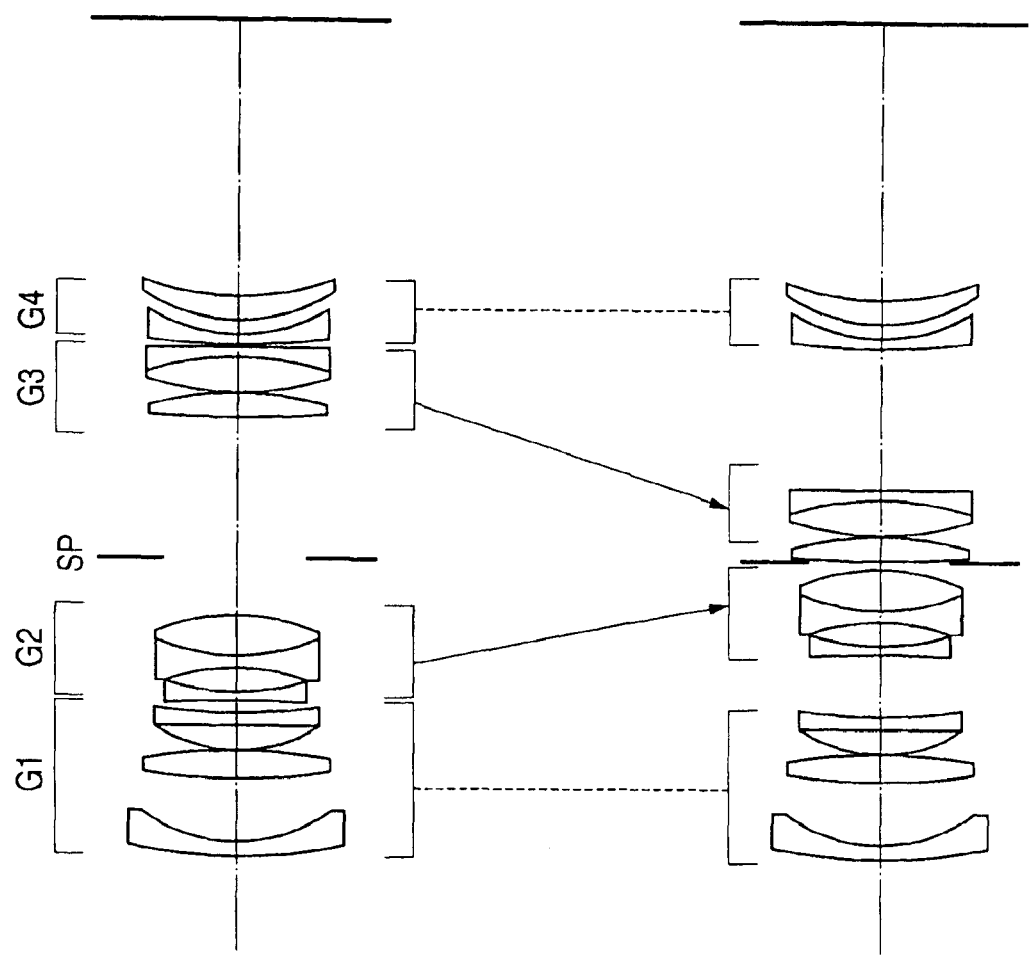
FIGS. 2A and 2B are lens cross-sectional views of an image taking lens according to a second numerical embodiment.
Figures 3A, 3B:
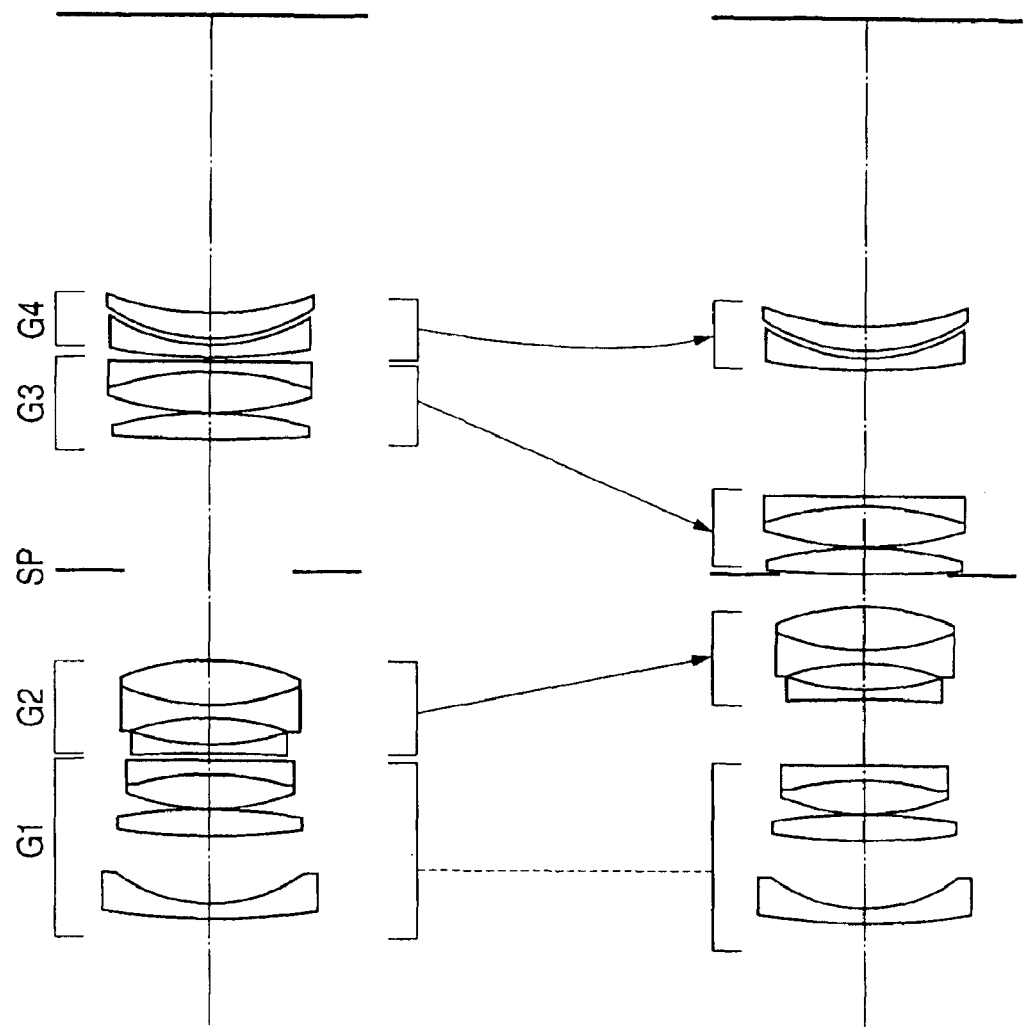
FIGS. 3A and 3B are lens cross-sectional views of an image taking lens according to a third numerical embodiment.
Figures 4A, 4B:
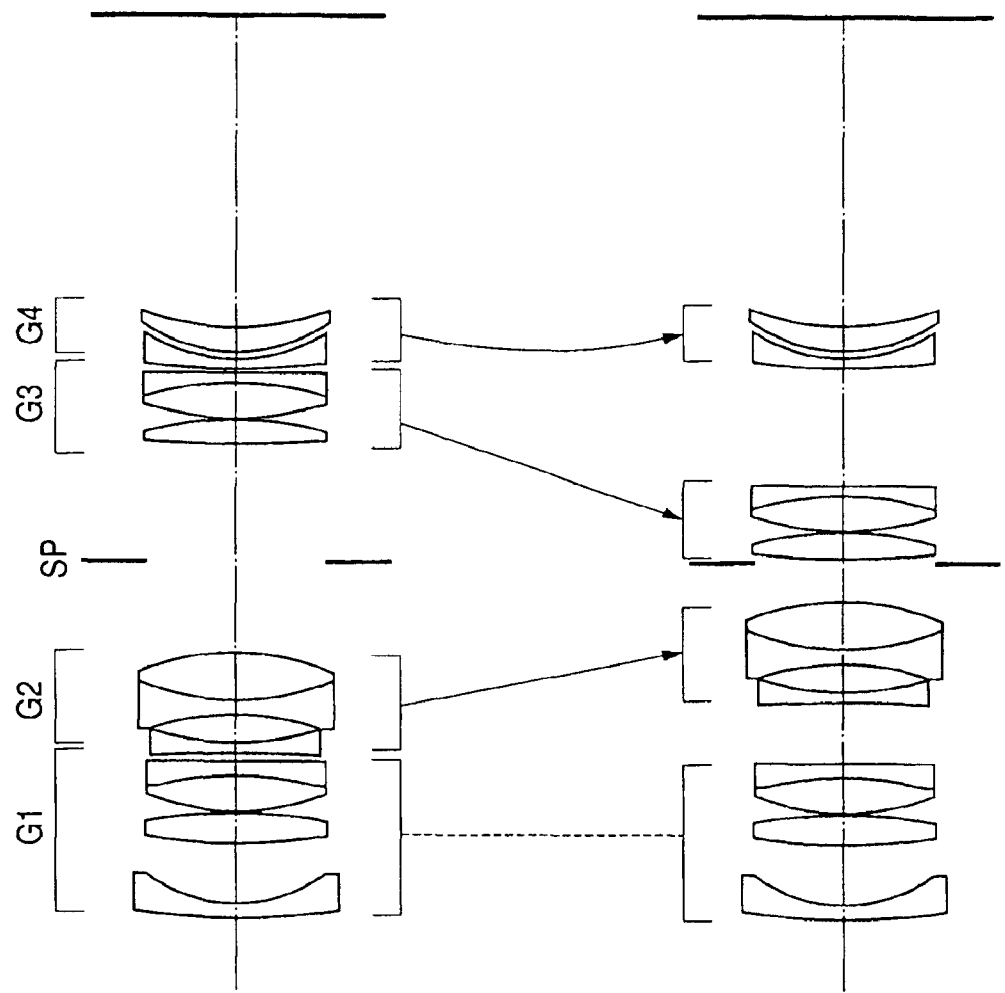
FIGS. 4A and 4B are lens cross-sectional views of an image taking lens according to a fourth numerical embodiment.
Figures 5A, 5B:
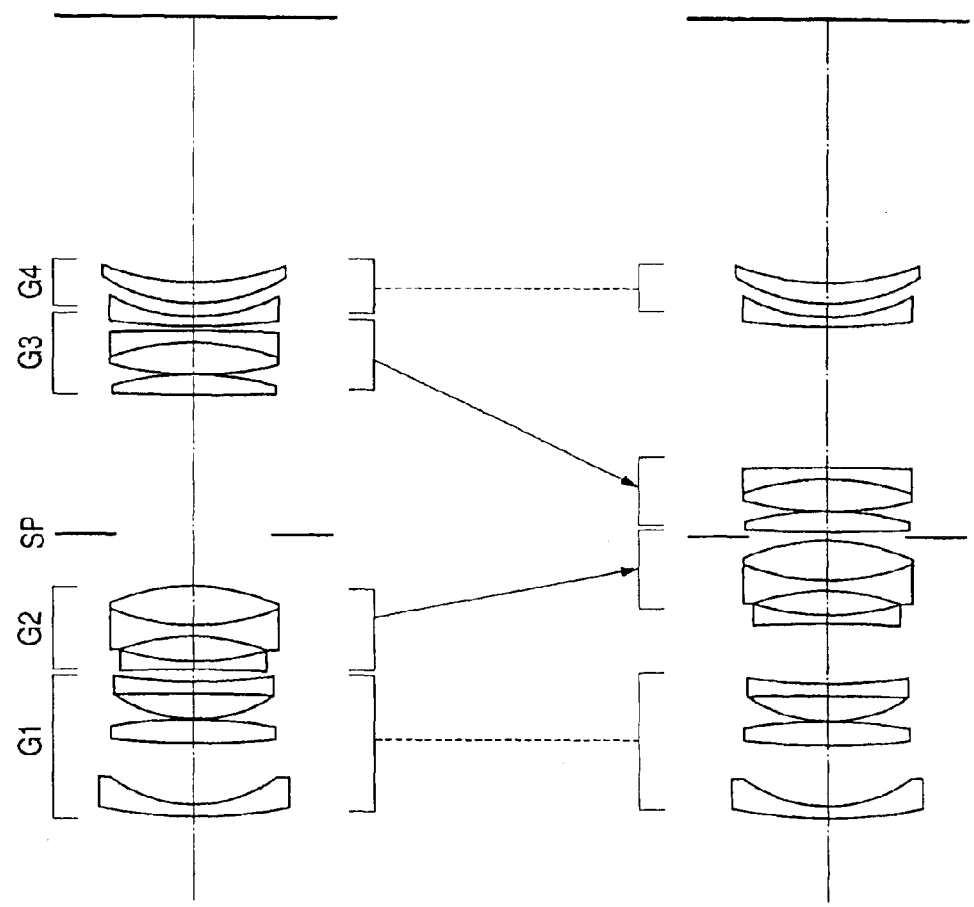
FIGS. 5A and 5B are lens cross-sectional views of an image taking lens according to a fifth numerical embodiment.
Figure 6A:
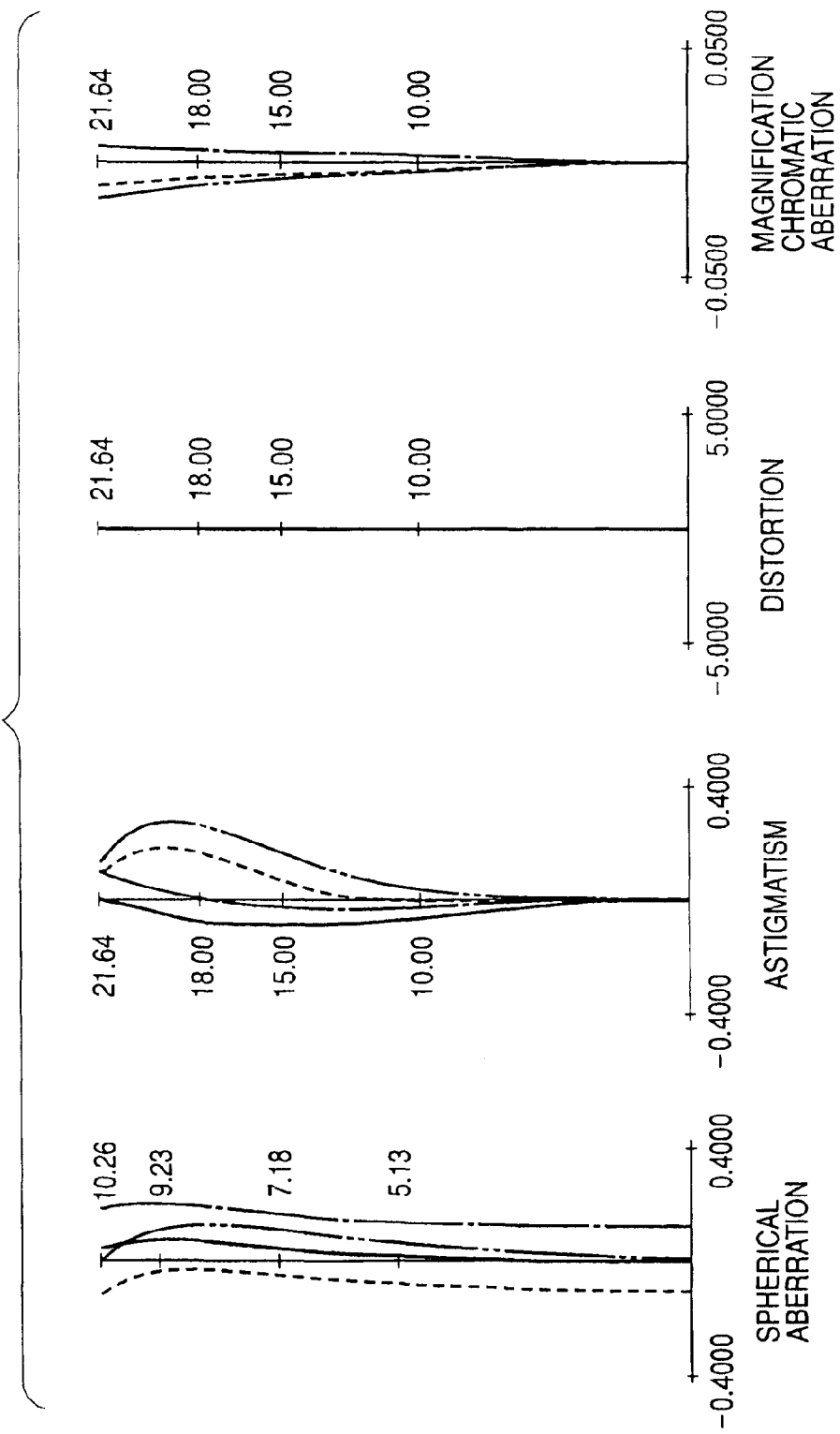
FIGS. 6A and 6B show the aberrations of the image taking lens according to the first numerical embodiment.
Figure 6B:
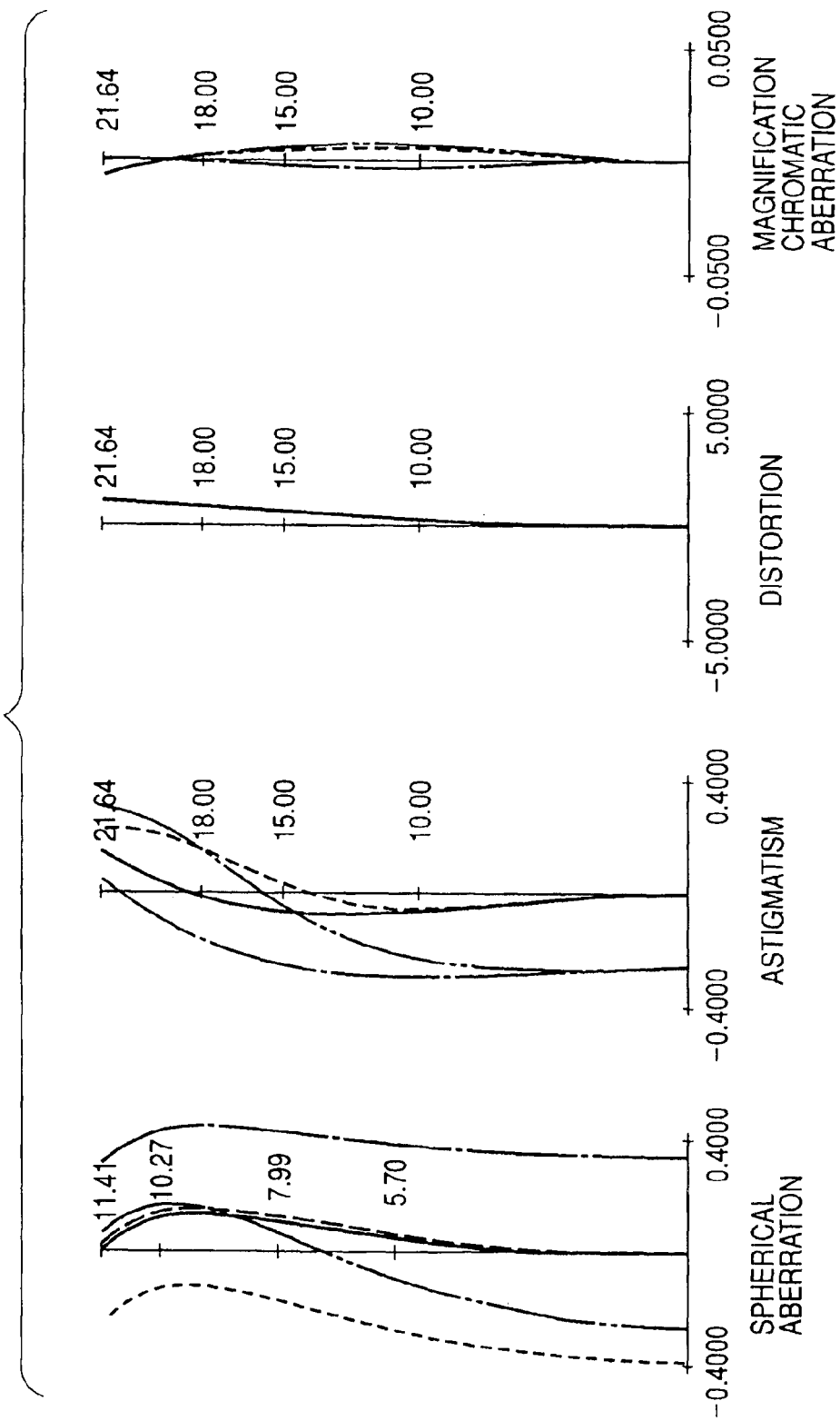
Figure 7A:
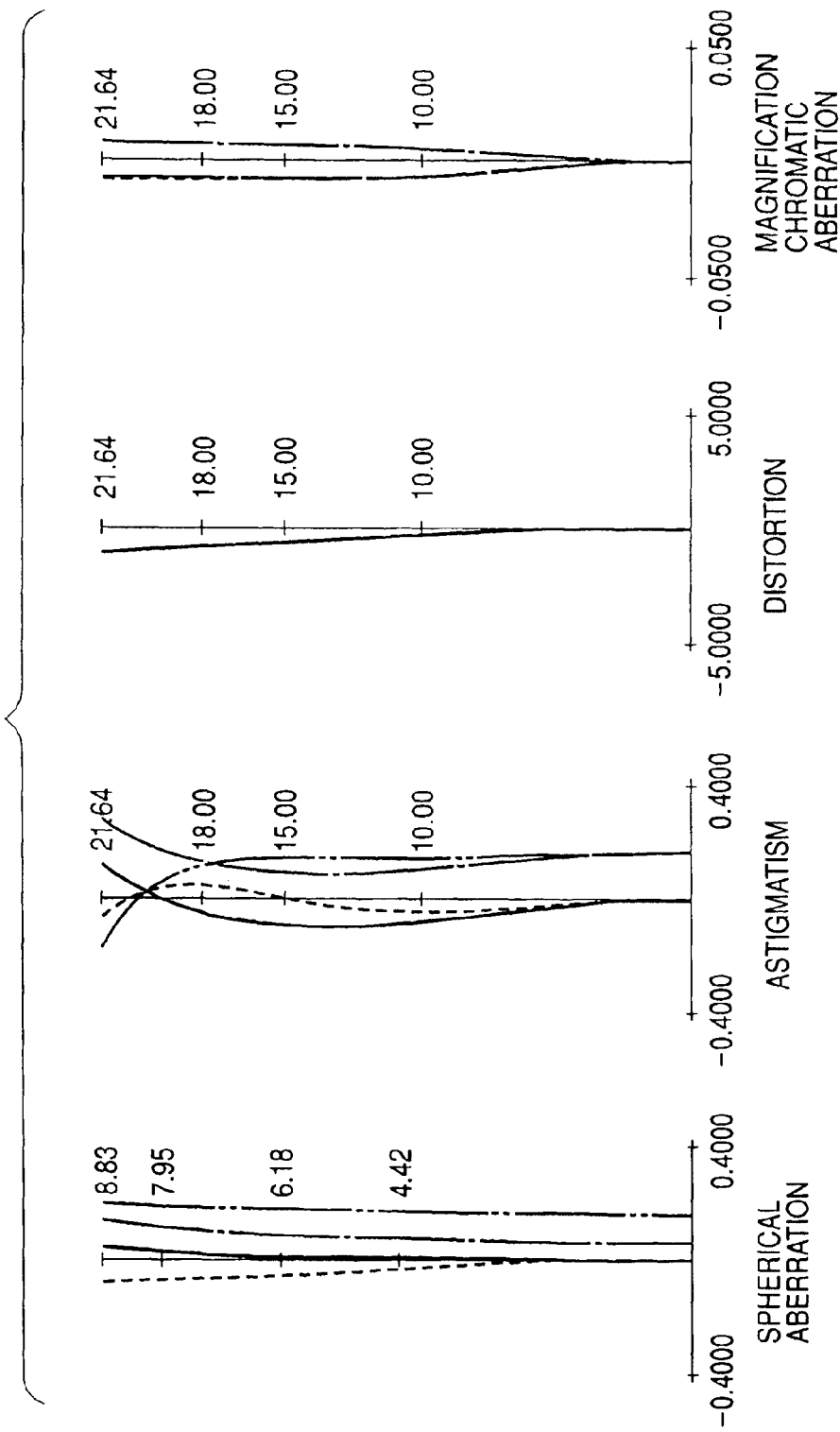
FIGS. 7A and 7B show the aberrations of the image taking lens according to the second numerical embodiment.
Figure 7B:
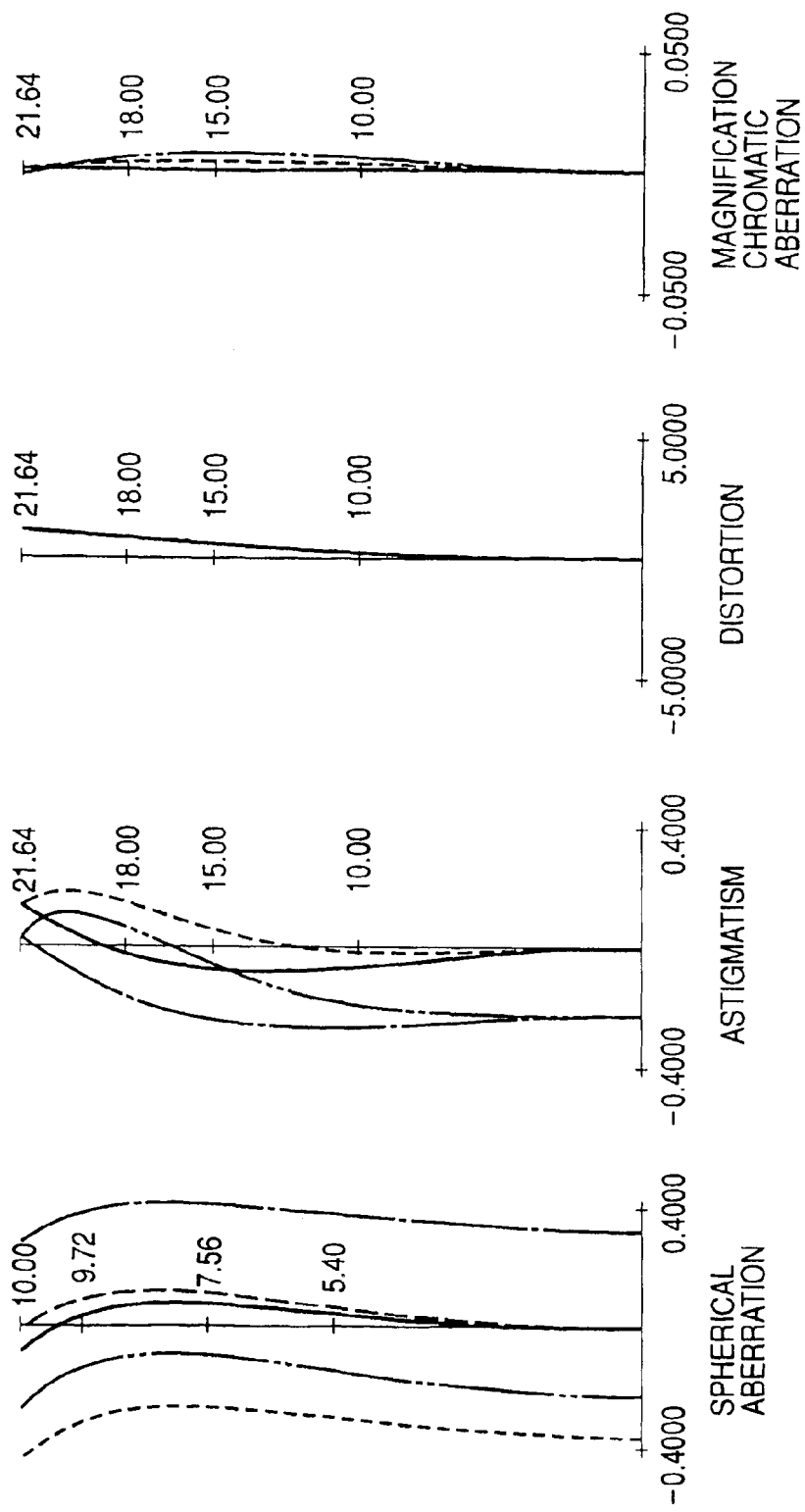
Figure 8A:
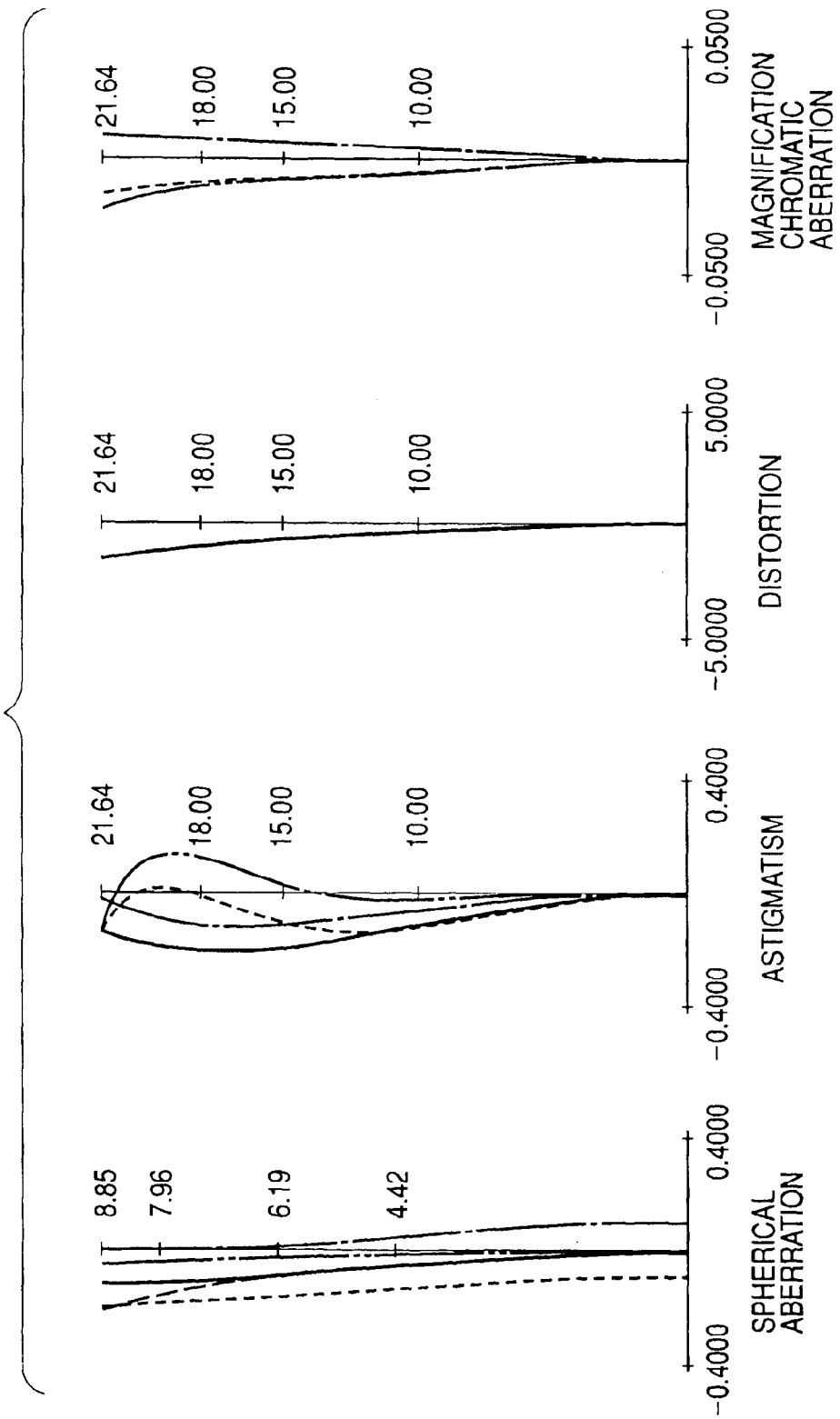
Figure 9A:
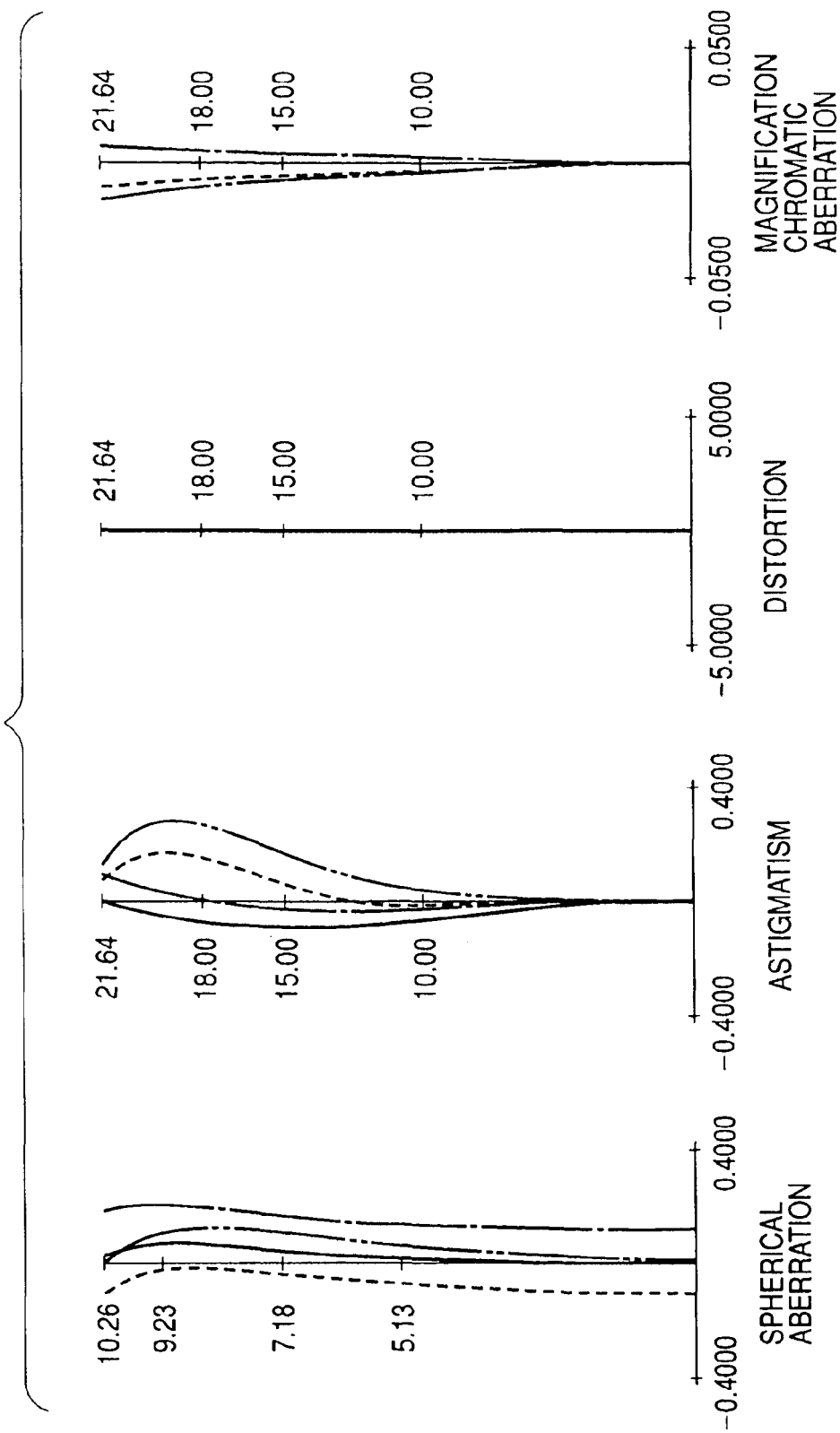
FIGS. 9A and 9B show the aberrations of the image taking lens according to the fourth numerical embodiment.
Figure 9B:
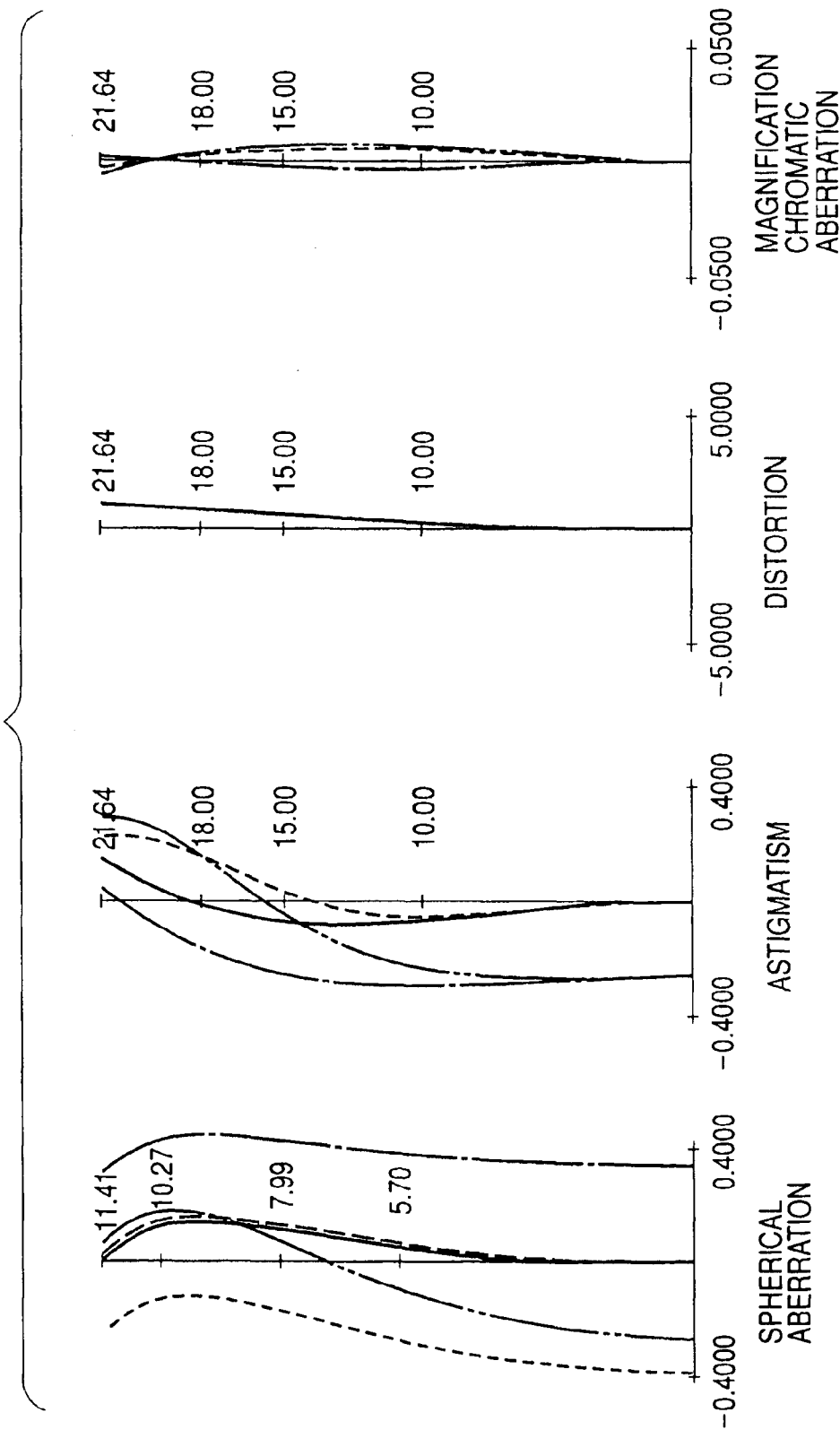
Figure 10A:
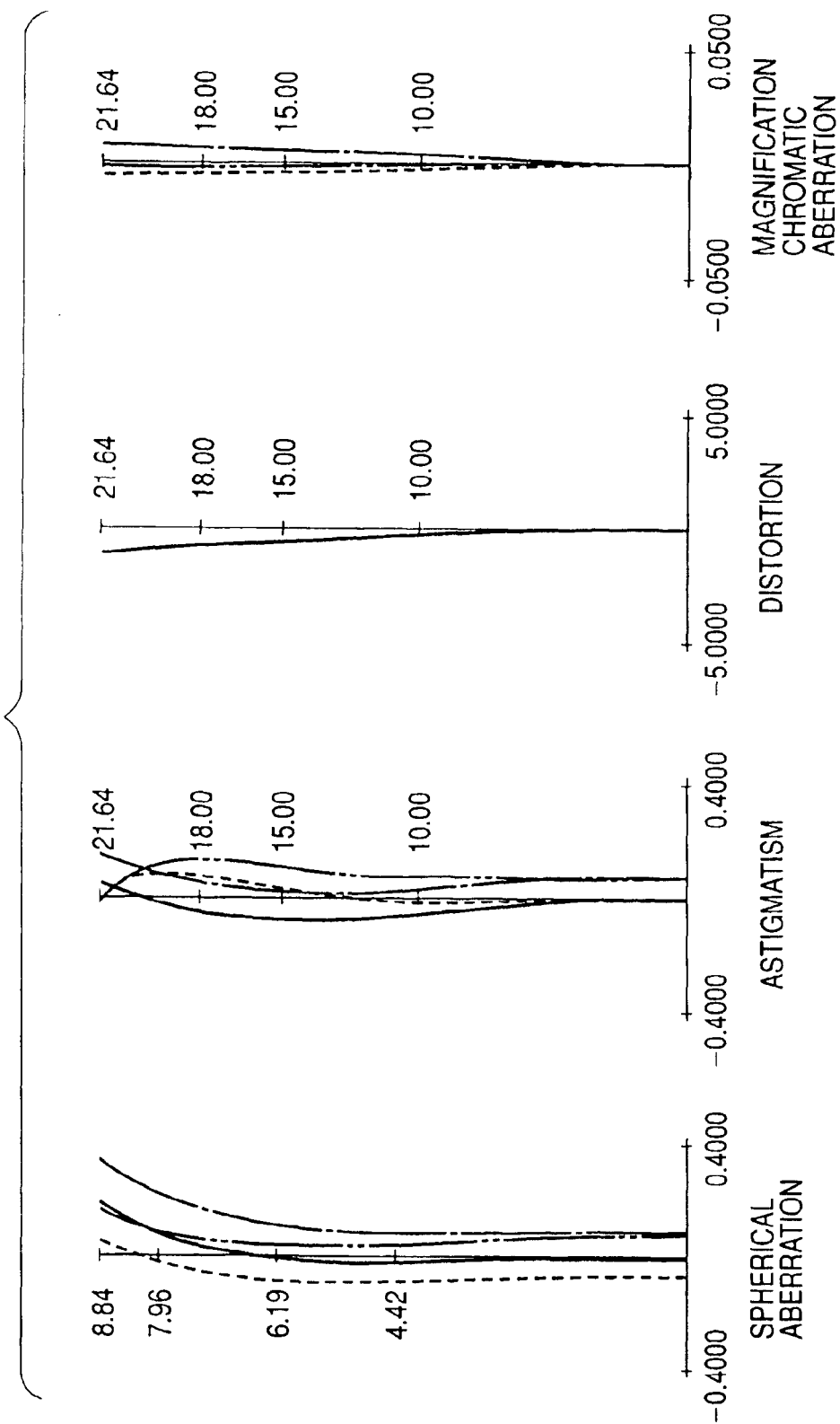
FIGS. 10A and 10B show the aberrations of the image taking lens according to the fifth numerical embodiment.
Figure 10B:
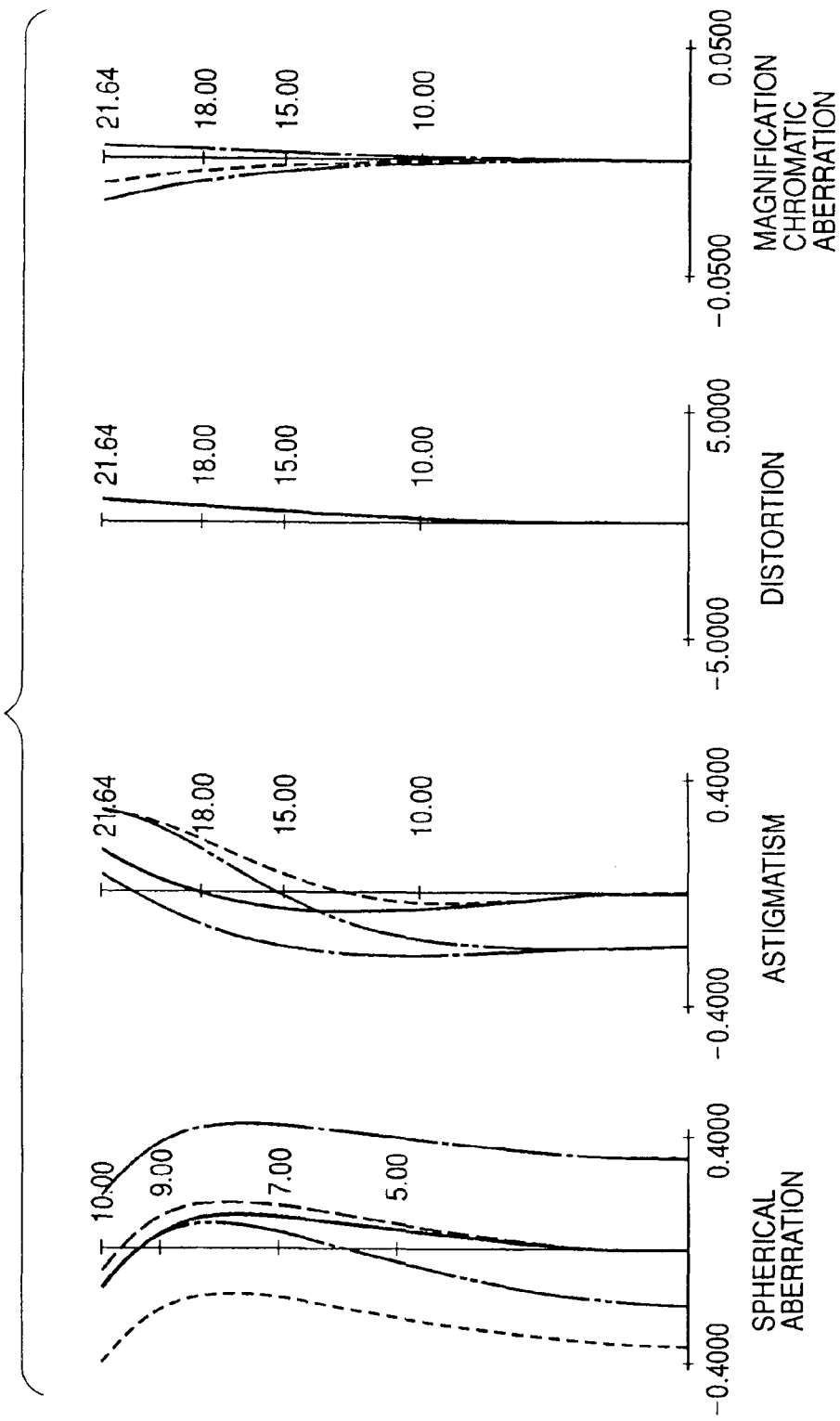

The image taking lens system of the present invention and an embodiment of a camera using the same will hereinafter be described with reference to the drawings. The image taking lens of the present embodiment is a macrolens of an inner focus type having an angle of view of 24° and an aperture ratio of F number of the order of 2.8 for use in a silver halide photographic camera, a video camera or a digital still camera, and capable of short-distance photographing up to a one-to-one magnification degree.

FIGS. 1A and 1B through FIGS. 5A and 5B are lens cross-sectional views of image taking lenses corresponding to first to fifth numerical embodiments which will be described later. FIGS. 1A, 2A, 3A, 4A and 5A show the state when the image taking lens is in-focus on an infinity object, and FIGS. 1B, 2B, 3B, 4B and 5B show the state when the image taking lens is in focus on a short-distance object (one-to-one magnification of −1.0 time).

In FIGS. 1A and 1B through FIGS. 5A and 5B, G1 designates a first lens unit of positive refractive power (optical power=inverse number of a focal length), G2 denotes a second lens unit of negative refractive power, G3 designates a third lens unit of positive refractive power, and G4 denotes a fourth lens unit of negative refractive power. Sp designates an aperture stop for adjusting a quantity of light arriving at an image plane.

In the image taking lenses according to the first to fifth numerical embodiments, in case of focusing from the infinity object to the short-distance object, the first lens unit G1 is not moved, but the second lens unit G2 is moved to an image side and the third lens unit G3 is moved to an object side.

In the image taking lenses according to the first numerical embodiment, the second numerical embodiment and the fifth numerical embodiment (FIGS. 1A, 1B, 2A, 2B, 5A and 5B), the fourth lens unit G4 is not moved in case of focusing, and in the image taking lenses according to the third numerical embodiment and the fourth numerical embodiment (FIGS. 3A, 3B, 4A and 4B), the fourth lens unit G4 is moved as shown in case of focusing.

FIGS. 6A, 6B through 10A and 10B show the aberrations of the image taking lenses according to the first to fifth numerical embodiments, respectively. FIGS. 6A, 7A, 8A, 9A and 10A show the aberrations when the image taking lenses are in focus on the infinity object, and FIGS. 6B, 7B, 8B, 9B and 10B show the aberrations in a state (photographing magnification of −1.0 time) in which the image taking lenses are in focus on a close-range object.

Description will hereinafter be made of the features of the lens construction of the inner focus type macrolens according to the present embodiment.

Firstly, in the image taking lens according to the present embodiment, the principal point interval between the first lens unit G1 and the second lens unit G2 is a negative value. That is, the object side principal point of the second lens unit G2 is located more adjacent to the object side than the image side principal point of the first lens unit G1. By arranging the elements as described, while variation of aberrations caused during focusing is suppressed, wide angle of view is realized.

Also, in the state in which the image taking lens is in focus on the infinity object, the following condition is satisfied between the focal length $f_2$ of the second lens unit G2 and the focal length f of the entire system:

$$0.8 < |f_2|/f < 3.0 \quad (1)$$

This conditional expression (1) is an expression relating to the full length and working distance of the lens. If the upper limit of this expression is exceeded, the focal length of the entire system in one-to-one magnification state will become short, and this will lead to a decrease in the working distance. If the lower limit of this expression is exceeded, the principal point interval between a front lens group constituted by the first lens unit G1 and the second lens unit G2 and a rear lens group constituted by the third lens unit G3 and the fourth lens unit G4 will become great and the full length of the lens will become great.

Also, in the state in which the imaging lens is in focus on the infinity object, there is the following relational expression between the focal length $f_3$ of the third lens unit G3 and the focal length f of the entire system:

$$0.8 < |f_3|/f < 1.1 \quad (2)$$

This conditional expression (2) is an expression concerned with the full length of the lens and the correction of aberration fluctuations. If the lower limit of this conditional expression is exceeded, the refractive power of the third lens unit G3 operating as a main focusing lens unit will become too strong and therefore, the correction of the fluctuations of various aberrations will become difficult. If the upper limit of this conditional expression is exceeded, the full length of the lens will become great. Further, the upper limit of the conditional expression (2) being exceeded means that the negative refractive power of a lens in the third lens unit G3 which is located most adjacent to the object side becomes strong, and spherical aberration will become under-corrected.

Also, a meniscus-shaped negative lens element is disposed on the side of the first lens unit G1 which is most adjacent to the object side, and further the side of the entire system which is most adjacent to the object side. Also in the state in which the image taking lens is in focus on the infinity object, there is the following relation between the focal length $f_{11}$ of this negative meniscus lens and the focal length f of the entire system:

$$-2.0 < f_{11}/f < -0.8 \quad (3)$$

This conditional expression (3) is an expression relating to the shortening of the focal length of the entire system. If the lower limit of this expression is exceeded, the negative refractive power of the first lens unit G1 will become weak and the back focal length will become short, and if an attempt is made to secure it, the correction of the various aberrations will become difficult. If the upper limit of this expression is exceeded, the negative refractive power of the first lens unit G1 will become strong, and the correction of the aberrations will become difficult.

The inner focus type macrolens which is the object of the present invention is achieved by the above-described construction, but to achieve still higher optical performance, when the composite focal length of the first lens unit G1 and the second lens unit G2 in the state in which the image taking lens is in focus on the infinity object is defined as $f_{12}$ and the composite focal length of the third lens unit G3 and the fourth lens unit G4 also in the state in which the image taking lens is in focus on the infinity object is defined as $f_{34}$, it is preferable to satisfy the following conditions:

$$2.3 < f_{12}/f < 4.3 \quad (4)$$

$$1.5 < f_{34}/f < 3.0 \quad (5)$$

$$1.0 < f_{12}/f_{34} < 2.5 \quad (6)$$

Conditional expression (4) is an expression relating to the composite focal length of the first lens unit G1 and the second lens unit G2. If the lower limit of this expression is exceeded, it will become difficult to secure the back focal length, and if an attempt is made to secure it, the correction of the fluctuations of the various aberrations will become difficult. The lower limit of conditional expression (4) being exceeded means that the refractive power of the negative meniscus lens in the first lens unit G1 which is disposed most adjacent to the object side is weak. On the other hand, if the upper limit of this expression is exceeded, the full length of the lens will become great.

Conditional expression (5) is an expression relating to the composite focal length of the third lens unit G3 and the fourth lens unit G4. If the lower limit of this expression is exceeded, the correction of the fluctuations of the various aberrations will become difficult, and if the upper limit of this expression is exceeded, the full length of the lens will become great.

Conditional expression (6) is an expression relating to the composite focal length of the first lens unit G1 and the second lens unit G2 and the focal length of the third lens unit G3 and the fourth lens unit G4. If the lower limit of this expression is exceeded, the correction of the fluctuations of the various aberrations will become difficult, and if the upper limit of this expression is exceeded, the full length of the lens will become great and spherical aberration will become under-corrected.

Further, when the amount of movement in case of the focusing of the second lens unit G2 from the infinity object to the closest range object is defined as $\Delta s2$, and the amount of movement in case of the focusing of the third lens unit G3 from the infinity object to the closest range object is defined as $\Delta s3$, it is preferable to satisfy the following condition expression:

$$-0.5 < \Delta s2/\Delta s3 < -0.3 \quad (7)$$

If the lower limit of this conditional expression is exceeded, the full length of the lens will become great.

If the upper limit of this conditional expression is exceeded, the correction of the fluctuations of the various aberrations resulting from the focusing will become difficult.

The image taking lenses according to the first to fifth numerical embodiments satisfy conditional expressions (1) and (2). The image taking lenses according to the first to fourth numerical embodiments satisfy conditional expression (3).

The image taking lenses according to the second numerical embodiment, the third numerical embodiment and the fifth numerical embodiment satisfy conditional expression (4), the image taking lenses according to the first numerical embodiment, the second numerical embodiment, the third numerical embodiment, the fourth numerical embodiment and the fifth numerical embodiment satisfy conditional expression (5), the image taking lenses according to the first numerical embodiment, the third numerical embodiment, the fourth numerical embodiment and the fifth numerical embodiment satisfy conditional expression (6), and the image taking lenses according to the second numerical embodiment, the third numerical embodiment, the fourth numerical embodiment and the fifth numerical embodiment satisfy conditional expression (7).

(Numerical Embodiments)

The numerical data of the first to fifth numerical embodiments will be shown below. In each numerical embodiment, the aperture stop is located between the second lens unit and the third lens unit. In the data table of each embodiment, the numbers at the left end indicates the surface numbers from the object side, r indicates the radius of curvature, d indicates the surface interval, nd indicates the refractive index for d-line, and rd indicates the Abbe number with the d-line as the reference. f indicates the focal length, Fno indicates F number, and $\omega$ indicates a half angle of view.

Also, the values of the aforedescribed conditional expressions (1) to (7) are shown in Table 1.

First Numerical Embodiment

| | f = 50 | Fno.2.8 | 2ω = 23° | |
|---|---|---|---|---|
| | r | d | nd | vd |
| 1 | 115.00772 | 1.99677 | 1.612716 | 58.72 |
| 2 | 21.78411 | 9.751 | | |
| 3 | 85.78794 | 4 | 1.804398 | 39.59 |
| 4 | −72.70214 | 0.15224 | | |
| 5 | 32.84808 | 4.91896 | 1.651597 | 58.55 |
| 6 | −43.3562 | 1.84959 | 1.84666 | 23.78 |
| 7 | 1385.45509 | Variable | | |
| 8 | −166.08434 | 1.37137 | 1.882997 | 40.76 |
| 9 | 31.31431 | 3.7429 | | |
| 10 | −33.54624 | 2 | 1.639999 | 60.07 |
| 11 | 31.03576 | 6.53694 | 1.834807 | 42.72 |
| 12 | −28.18164 | Variable | | |
| 13 | Stop | Variable | | |
| 14 | 213.35815 | 3.16748 | 1.603112 | 60.64 |
| 15 | −47.37145 | 0.3955 | | |
| 16 | 40.25073 | 5.5967 | 1.563839 | 60.67 |
| 17 | −37.0585 | 1.18309 | 1.84666 | 23.78 |
| 18 | −1788.00383 | Variable | | |
| 19 | 221.14268 | 1.17844 | 1.772499 | 49.60 |
| 20 | 24.51316 | 0.63789 | | |
| 21 | 24.58988 | 3.36048 | 1.761821 | 26.52 |
| 22 | 35.80335 | 37.91209 | | |

| | (Focusing on ∞) | (Magnification: −0.5) | (Magnification: −1.0) |
|---|---|---|---|
| d7 | 1.350316 | 4.79147 | 10.1534 |
| d12 | 13.0166 | 9.579496 | 4.212328 |
| d13 | 16.80352 | 8.348689 | 0.4918 |
| d18 | 0.917163 | 9.284323 | 17.22968 |

Second Numerical Embodiment

| | f = 50 | Fno.2.8 | 2ω = 23° | |
|---|---|---|---|---|
| | r | d | nd | vd |
| 1 | 66.50498 | 2 | 1.806098 | 40.92 |
| 2 | 23.71183 | 9.83233 | | |
| 3 | 94.52845 | 4 | 1.806098 | 40.92 |
| 4 | −59.83555 | 0.15 | | |
| 5 | 25.98714 | 3.5 | 1.696797 | 55.53 |
| 6 | −3741.26955 | 1.85 | 1.846660 | 23.78 |
| 7 | 64.68535 | Variable | | |
| 8 | 16401.70439 | 1.4 | 1.834807 | 42.72 |
| 9 | 24.14979 | 3.72463 | | |
| 10 | −26.17439 | 1.4 | 1.603112 | 60.64 |
| 11 | 29.02264 | 6.5 | 1.785896 | 44.20 |
| 12 | −27.53037 | Variable | | |
| 13 | Stop | Variable | | |
| 14 | 295.43121 | 3 | 1.603112 | 60.64 |
| 15 | −44.27573 | 0.15003 | | |
| 16 | 52.38671 | 5 | 1.603112 | 60.64 |
| 17 | −40.74572 | 1.8 | 1.84666 | 23.78 |
| 18 | 1303.01099 | Variable | | |
| 19 | 77.63608 | 1.5 | 1.719995 | 50.22 |
| 20 | 25.91181 | 2.12469 | | |
| 21 | 27.39389 | 3 | 1.717362 | 29.50 |
| 22 | 39.60108 | 41.45224 | | |

| | (Focusing on ∞) | (Magnification: −0.5) | (Magnification: −1.0) |
|---|---|---|---|
| d7 | 1.93447 | 5.177822 | 9.496911 |
| d12 | 8.89367 | 5.650107 | 1.331522 |
| d13 | 21.84553 | 9.013635 | 0.461018 |
| d18 | 0.69460 | 9.27902 | 22.07905 |

Third Numerical Embodiment

| | f = 50 | Fno.2.8 | 2ω = 23° | |
|---|---|---|---|---|
| | r | d | nd | vd |
| 1 | 150.67735 | 1.83680 | 1.612716 | 58.72 |
| 2 | 22.57346 | 9.58301 | | |
| 3 | 60.27003 | 4 | 1.804398 | 39.59 |
| 4 | −78.90792 | 0.14868 | | |
| 5 | 35.74925 | 4.03565 | 1.651597 | 58.55 |
| 6 | −48.29254 | 1.84764 | 1.84666 | 23.78 |
| 7 | 543.79648 | Variable | | |
| 8 | −878.88216 | 1.17437 | 1.882997 | 40.76 |
| 9 | 28.18880 | 3.58554 | | |
| 10 | −29.85656 | 2 | 1.639999 | 60.07 |
| 11 | 31.48063 | 6.32752 | 1.834807 | 42.72 |
| 12 | −29.80371 | Variable | | |

-continued

| | f = 50 | Fno.2.8 | 2ω = 23° | |
|---|---|---|---|---|
| 13 | Stop | Variable | | |
| 14 | 216.27438 | 3.45184 | 1.603112 | 60.64 |
| 15 | -42.42590 | 0.07499 | | |
| 16 | 43.41831 | 6.19788 | 1.563839 | 60.67 |
| 17 | -38.57082 | 1.12161 | 1.84666 | 23.78 |
| 18 | 1121.19301 | Variable | | |
| 19 | 124.88978 | 1.13959 | 1.772499 | 49.60 |
| 20 | 24.60926 | 1.42352 | | |
| 21 | 26.02916 | 3.59768 | 1.761821 | 26.52 |
| 22 | 40.26601 | 42.70379 | | |

| | (Focusing on ∞) | (Magnification: -0.5) | (Magnification: -1.0) |
|---|---|---|---|
| d7 | 1.24705 | 4.853858 | 9.898873 |
| d12 | 13.06268 | 9.456024 | 4.39846 |
| d13 | 18.34951 | 9.309686 | 0.439465 |
| d18 | 0.93710 | 9.519019 | 17.4228 |

Fourth Numerical Embodiment

| | f = 60 | Fno.2.8 | 2ω = 19° | |
|---|---|---|---|---|
| | r | d | nd | νd |
| 1 | 110.95560 | 1.99187 | 1.612716 | 58.72 |
| 2 | 23.39728 | 8.75644 | | |
| 3 | 101.97027 | 4 | 1.804398 | 39.59 |
| 4 | -72.34949 | 0.68904 | | |
| 5 | 33.83231 | 5.15590 | 1.651597 | 58.55 |
| 6 | -46.82644 | 1.84950 | 1.84666 | 23.78 |
| 7 | -9245.25134 | Variable | | |
| 8 | -179.79613 | 1.36572 | 1.882997 | 40.76 |
| 9 | 32.27252 | 4.15310 | | |
| 10 | -32.62375 | 2 | 1.639999 | 60.07 |
| 11 | 34.19271 | 7.06762 | 1.834807 | 42.72 |
| 12 | -29.04183 | Variable | | |
| 13 | Stop | Variable | | |
| 14 | 306.99026 | 3.52797 | 1.603112 | 60.64 |
| 15 | -45.22440 | 0.45673 | | |
| 16 | 41.71080 | 5.18931 | 1.563839 | 60.67 |
| 17 | -41.78514 | 1.17942 | 1.84666 | 23.78 |
| 18 | 1196.39387 | Variable | | |
| 19 | 235.02405 | 1.18460 | 1.772499 | 49.60 |
| 20 | 24.53977 | 1.23699 | | |
| 21 | 25.46594 | 3.37421 | 1.761821 | 26.52 |
| 22 | 38.51150 | 44.79209 | | |

| | (Focusing on ∞) | (Magnification: -0.5) | (Magnification: -1.0) |
|---|---|---|---|
| d7 | 1.38246 | 4.371874 | 9.029904 |
| d12 | 12.98057 | 9.991211 | 5.333271 |
| d13 | 17.15679 | 8.413058 | 0.858992 |
| d18 | 0.93291 | 9.142834 | 17.26707 |

Fifth Numerical Embodiment

| | f = 50 | Fno.2.8 | 2ω = 23° | |
|---|---|---|---|---|
| | r | d | nd | νd |
| 1 | 75.25994 | 2 | 1.806098 | 40.92 |
| 2 | 21.42281 | 9.71656 | | |
| 3 | 184.06695 | 4 | 1.806098 | 40.92 |
| 4 | -54.01108 | 0.15000 | | |
| 5 | 27.77456 | 3.50000 | 1.696797 | 55.53 |
| 6 | -209.01663 | 1.85000 | 1.84666 | 23.78 |
| 7 | 111.51020 | Variable | | |
| 8 | -499.73309 | 1.40000 | 1.834807 | 42.72 |
| 9 | 28.82495 | 4.04915 | | |
| 10 | -30.01746 | 1.40000 | 1.603112 | 60.64 |

-continued

| | f = 50 | Fno.2.8 | 2ω = 23° | |
|---|---|---|---|---|
| 11 | 34.90119 | 6.50000 | 1.785896 | 44.20 |
| 12 | -26.33523 | Variable | | |
| 13 | Stop | Variable | | |
| 14 | 841.21561 | 3.00000 | 1.603112 | 60.64 |
| 15 | -50.93167 | 0.15003 | | |
| 16 | 60.02894 | 5.00000 | 1.603112 | 60.64 |
| 17 | -35.42829 | 1.80000 | 1.84666 | 23.78 |
| 18 | -311.03709 | Variable | | |
| 19 | 78.61014 | 1.50000 | 1.719995 | 50.22 |
| 20 | 26.64005 | 2.24373 | | |
| 21 | 26.92617 | 3.00000 | 1.717362 | 29.5 |
| 22 | 34.61848 | 41.62772 | | |

| | (Focusing on ∞) | (Magnification: -0.5) | (Magnification: -1.0) |
|---|---|---|---|
| d7 | 1.96208 | 4.970468 | 9.207935 |
| d12 | 8.04793 | 5.039448 | 0.802418 |
| d13 | 22.04871 | 10.95185 | 0.804663 |
| d18 | 0.80749 | 11.9044 | 22.05156 |

TABLE 1

| Numerical Embodiment | Conditional Expression | | | | | | |
|---|---|---|---|---|---|---|---|
| | (1) | (2) | (3) | (4) | (5) | (6) | (7) |
| 1 | 2.7 | 0.84 | -0.86 | 2.24 | 2.17 | 1.03 | -0.54 |
| 2 | 1.4 | 0.92 | -0.91 | 4.14 | 1.47 | 2.81 | -0.35 |
| 3 | 1.8 | 0.85 | -0.84 | 3.52 | 1.66 | 2.12 | -0.48 |
| 4 | 2.1 | 0.76 | -0.81 | 2.20 | 2.17 | 1.02 | -0.47 |
| 5 | 2.7 | 1.03 | -0.73 | 2.33 | 2.07 | 1.13 | -0.34 |

An embodiment in which the aforedescribed image taking lens is applied to an optical apparatus will now be described with reference to FIG. 11.

Figure 11:
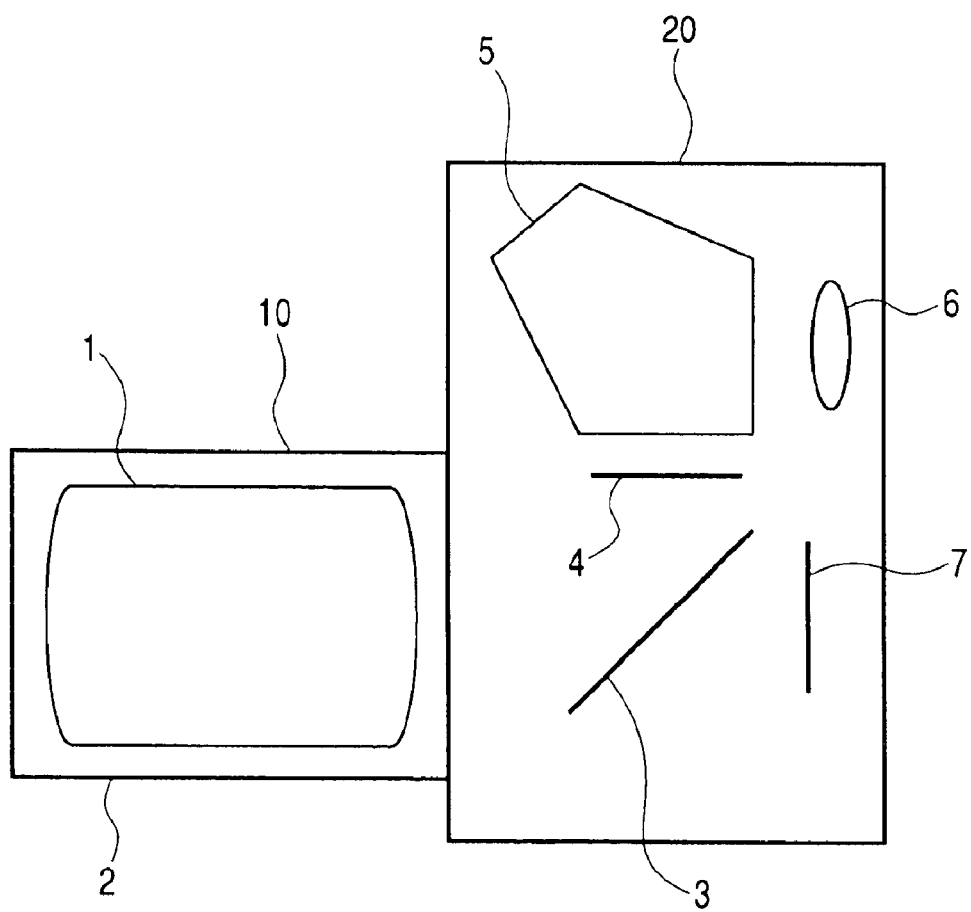
FIG. 11 is a schematic view of the essential portions of a single-lens reflex camera.

FIG. 11 is a schematic view of the essential portions of a single-lens reflex camera. In FIG. 11, the reference numeral 10 designates an interchangeable lens provided with the image taking lens system (macrolens) 1 of the present invention. The image taking lens 1 is held by a lens barrel 2 which is a holding member. The reference numeral 20 denotes a camera main body which is constituted by a quick return mirror 3 for upwardly reflecting a beam from the interchangeable lens, a focusing plate 4 disposed at the image forming position of the image taking lens 1, a pentaprism 5 for transforming an inverted image formed on the focusing plate 4 into an erect image, an eyepiece 6 for observing the erect image therethrough, etc. The reference numeral 7 designates a photosensitive surface on which is disposed silver halide film or the light receiving surface of a solid state image pickup element (photoelectric conversion element) such as a CCD sensor or a CMOS sensor. During photographing, the quick return mirror 3 is retracted from an optical path and an image is formed on the photosensitive surface 7 by the image taking lens 1.

As described above, the image taking lens of the present invention can be applied to an optical apparatus such as a single-lens reflex camera.

What is claimed is:

1. An image taking lens system provided, in succession from an object side to an image side, with:
    a first lens unit adapted to be not moved for focusing;
    a second lens unit adapted to be moved to the image side in case of focusing from an infinity object to a short-distance object;
    a third lens unit adapted to be moved to the object side in case of the focusing from the infinity object to the short-distance object; and a fourth lens unit;

wherein a principal point interval between said first lens unit and said second lens unit is a negative value.

2. An image taking lens system according to claim 1, wherein said first lens unit has positive optical power, said second lens unit has negative optical power, said third lens unit has positive optical power, and said fourth lens unit has negative optical power.

3. An image taking lens system according to claim 1, wherein the photographing magnification of said image taking lens system for a closest range object is −0.5 time or less.

4. An image taking lens system according to claim 1, wherein the following conditions are satisfied:

$$0.8 < |f_2|/f < 3.0$$

where $f_2$ is a focal length of said second lens unit and f is a focal length of an entire system.

5. An image taking lens system according to claim 1, wherein the following conditions are satisfied:

$$0.8 < |f_3|/f < 1.1$$

where $f_3$ is a focal length of said third lens unit and f is a focal length of an entire system.

6. An image taking lens system according to claim 1, wherein among lens elements with which said first lens unit is provided, the lens element located most adjacent to the object side is a meniscus-shaped negative lens element, and satisfies the following condition:

$$-2.0 < f_{11}/f < -0.8,$$

where $f_{11}$ is a focal length of said meniscus-shaped negative lens element, and f is a focal length of an entire system.

7. An image taking lens system according to claim 1, wherein the following conditions are satisfied:

$$2.3 < f_{12}/f < 4.3$$

where $f_{12}$ is a composite focal length of said first lens unit and said second lens unit when the image taking lens system is focused on the infinity object, and f is a focal length of an entire system.

8. An image taking lens system according to claim 1, wherein the following conditions are satisfied:

$$1.4 < f_{34}/f < 3.0$$

where $f_{34}$ is a composite focal length of said third lens unit and said fourth lens unit when the image taking lens system is focused on the infinity object and f is a focal length of an entire system.

9. An image taking lens system according to claim 1, wherein the following conditions are satisfied:

$$1.0 < f_{12}/f_{34} < 2.5,$$

where $f_{12}$ is a composite focal length of said first lens unit and said second lens unit when the image taking lens system is focused on the infinity object and $f_{34}$ is a composite focal length of said third lens unit and said fourth lens unit when the image taking lens system is focused on the infinity object.

10. An image taking lens system according to claim 1, wherein the following condition is satisfied:

$$-0.5 < \Delta s2/\Delta s3 < -0.3,$$

where $\Delta s2$ is a maximum movement amount of said second lens unit in case of focusing, and $\Delta s3$ is a maximum movement amount of said third lens unit in case of focusing.

11. An image taking lens system provided with:

a first lens unit;

a second lens unit;

a third lens unit; and a fourth lens unit;

wherein in case of focusing, said image taking lens system is changed in an interval between said first lens unit and said second lens unit, an interval between said second lens unit and said third lens unit, and an interval between said third lens unit and said fourth lens unit, a principal point interval between said first lens unit and said second lens unit is negative, and the photographing magnification of said image taking lens system for a closest range object is −0.5 time or less.

12. An image taking lens system according to claim 11, wherein said first lens unit has positive optical power, said second lens unit has negative optical power, said third lens unit has positive optical power, and said fourth lens unit has negative optical power.

\* \* \* \* \*